F. B. CANNOCK.
KINETOSCOPE PROJECTOR.
APPLICATION FILED JULY 25, 1912.
1,075,692.
Patented Oct. 14, 1913.
2 SHEETS—SHEET 2.
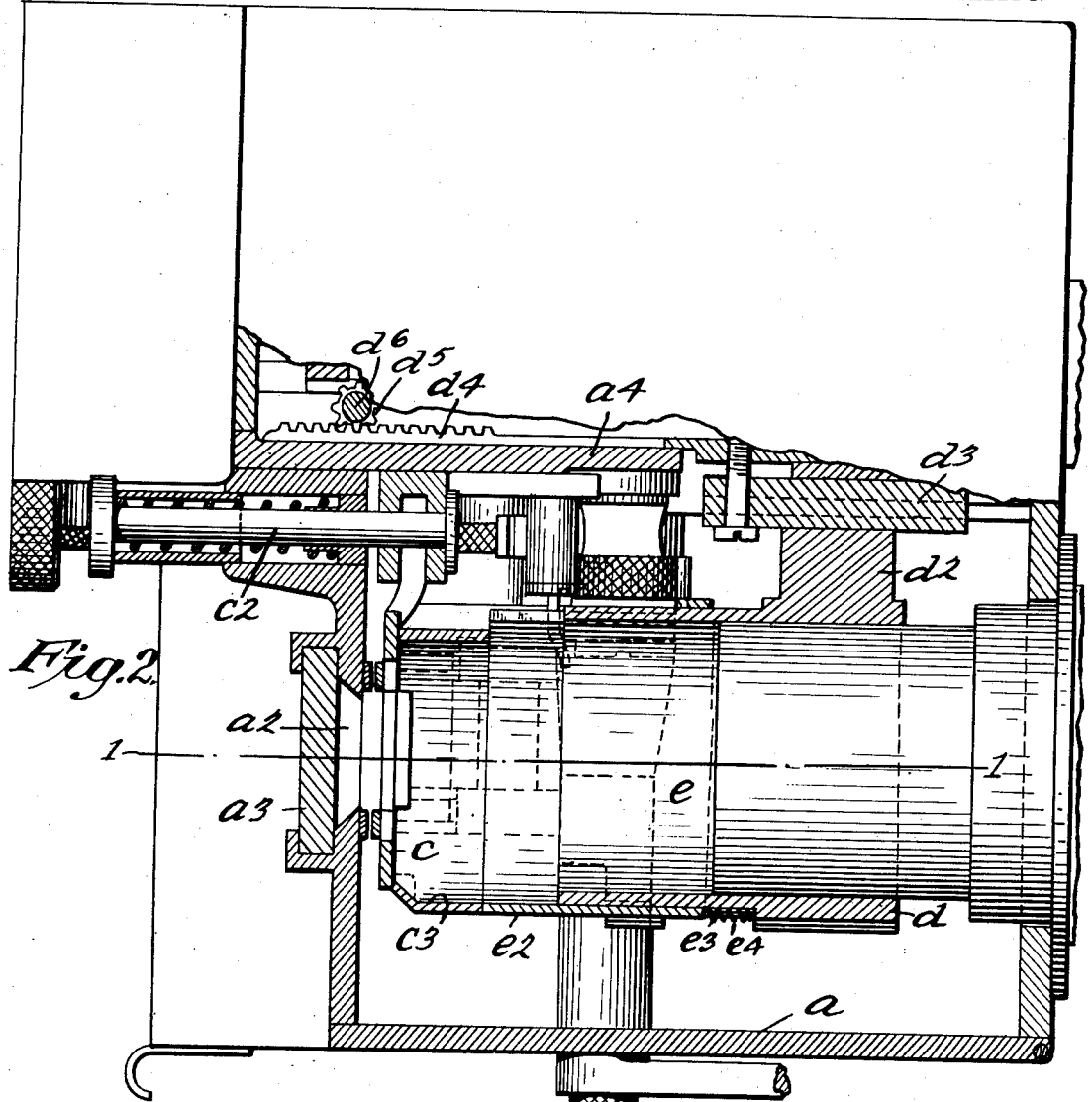
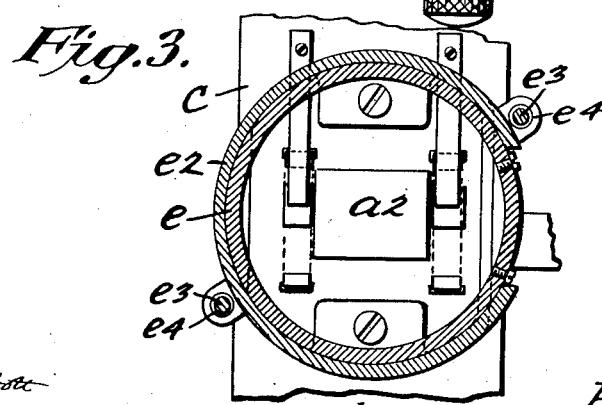
Attest:
Robt. R. Abbott
W. H. Champney
Inventor:
Francis B. Cannock
J. Ellis Larson
Atty

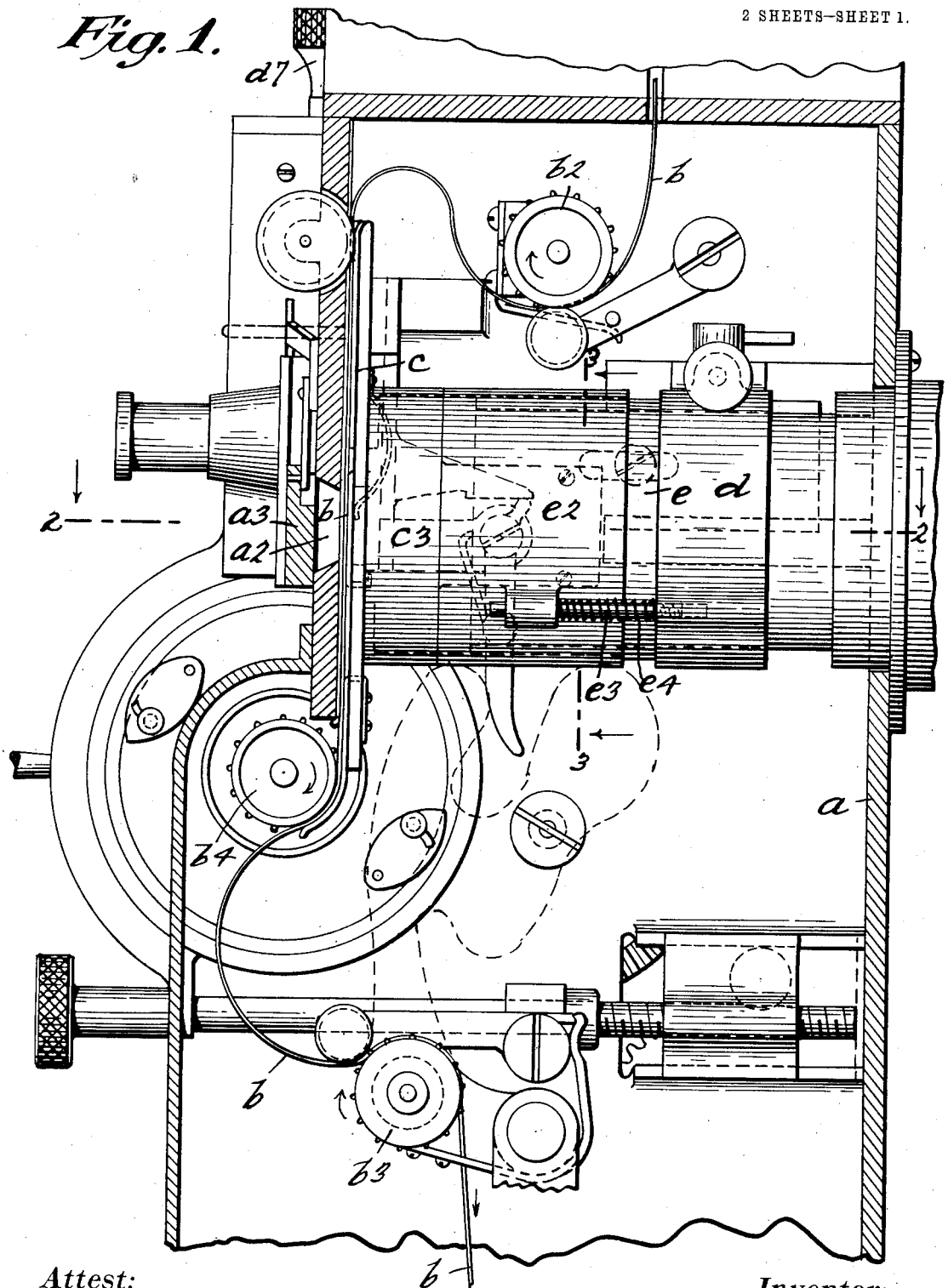

UNITED STATES PATENT OFFICE.

FRANCIS B. CANNOCK, OF NEW YORK, N. Y.

KINETOSCOPE-PROJECTOR.

1,075,692.   Specification of Letters Patent.   Patented Oct. 14, 1913.

Application filed July 25, 1912. Serial No. 711,363.

*To all whom it may concern:*

Be it known that I, FRANCIS B. CANNOCK, a citizen of the United States of America, and residing at New York, in the county of New York and State of New York, have invented certain new and useful Improvements in Kinetoscope-Projectors, of which the following is a specification, such as will enable those skilled in the art to which it appertains to make and use the same.

This invention relates to kinetoscopes, with a particular reference to the projectors thereof, and through which a strip of film bearing photographed matter is intermittently passed across a suitable aperture for a powerful ray of light, generally electric, of sufficient intensity to ignite the film if it be permitted to remain motionless in the path of the light for even a brief period, and it is to avoid any possibility of such ignition that my invention was conceived, for many serious accidents have occurred in just such a manner in moving picture theaters.

The film is generally carried from a reel through the projector and thence to a rewind reel, suitable mechanism being employed to move the film in the desired manner, but it frequently happens that the rewind reel does not move rapidly enough, or even clogs, with the result that the film already past the aperture backs up and is formed into loops between the aperture and the projecting lens where it is subjected to the intense heat of the ray of light and, igniting, causes a panic, but, even if the film is not ignited, the backed-up loops intercept the light and prevent projection of the pictures on the film at the aperture, thus compelling the operator to stop his machine until the backed-up film is carried to the rewind reel but, by means of my invention, no film can back up into the path of the light and thus no accidents can result from film ignition nor will the projection be interfered with.

The object of my invention is, therefore, to provide means for preventing the film from getting into the path of the light, except in the normal manner across the aperture; a further object is to provide such means which do not in any manner interfere with the normal operation of the projector or of any or its parts; a further object is to provide a substantially light-proof barrel or cylinder extending the full distance from the film being projected to the projecting lens; a further object is to make this barrel telescopic whereby the length thereof will be variable and accommodate itself to the movement of the film-trap door in the threading of a new film through the projector, and also permitting the removal of the said door for cleansing or repair; a further object is to so form the said barrel as to permit of the focusing of the lens without disarranging the substantially light-proof characteristics of the said barrel; and still further objects are to provide such protective devices which are very simple in construction, installation, and use; which are perfectly adapted to the purposes for which they are designed; and which are very inexpensive.

My invention is fully set forth in the following specification, of which the accompanying drawings form a part, in which the separate parts are designated by the same reference characters in each of the views, and in which:—

Figure 1 is vertical section taken through a portion of a projector provided with my invention, the latter not being in section, and approximately on the line 1—1 of Fig. 2; Fig. 2 is a horizontal section taken on the line 2—2 of Fig. 1; and Fig. 3 is a transverse section taken on the line 3—3 of Fig. 1.

In the drawings forming a part of this application I have shown a casing $a$ entirely inclosing the operative parts of a projector, only a portion of which, however, are shown as they form no part of this invention, the general arrangement of parts being clearly shown in Figs. 1 and 3 of U. S. patent to Porter, No. 1,041,345, of Oct. 15, 1912, but I do show the film $b$ passed around the constantly moving sprockets $b^2$ and $b^3$ and the intermittent sprocket $b^4$, said film being held firmly in position against the rear wall of the casing adjacent the aperture $a^2$ by means of a film-trap door $c$, said aperture being closed when the projector is inoperative by means of a fire-door $a^3$ which is adapted to be automatically opened as soon as operation begins, this mechanism not being shown as it forms no part of this invention and may be made in any suitable or desired manner.

The film-trap door $c$ is carried by a spring-actuated plunger-rod $c^2$ and is adapted to be removed therefrom for cleaning or repair in any desired manner, the reason for showing this being to show the relationship between the same and my invention, and I provide the door $c$ with a cylindrical collar $c^3$ concentric, or approximately so, with the aperture $a^2$, said collar being preferably secured to the trap door and removable therewith.

At $d$ I have shown the lens mount carried by an arm $d^2$, Fig. 2, secured to a slide-block $d^3$ movable and guided in a partition $a^4$ within the casing $a$, said block being adapted to be reciprocated to adjust the focus of the lens by means of a rack $d^4$ secured thereto and enmeshed with a pinion $d^5$ on a vertical rod $d^6$ extending above the casing and provided with a button $d^7$ whereby it may be manipulated to adjust the lens from the casing exterior.

Secured to, or integral with, the lens mount $d$ is a tube or barrel $e$ which extends a pretermined distance in a rearward direction, and slidably mounted upon the barrel $e$ is a sleeve $e^2$ adapted to be guided by rods $e^3$ secured to the mount $d$ and also adapted to be maintained in a rearward position by means of coil-springs $e^4$ on said rods, thus permitting a forward movement of the sleeve $e^2$ against the action of the springs, and it will be noted that the sleeve $e^2$ registers with, or approximately so, the collar $c^3$ thus forming, normally, an uninterrupted cylindrical chamber between the film-trap door $c$ and the lens within the mount, said mount extending beyond the forward side of the casing $a$, as shown, and it will be apparent, by means of this construction, that the lens may be adjusted rearwardly or forwardly, and the film-trap door may be moved forwardly by means of the plunger-rod $c^2$ to thread the film or to remove the door from its carrier, the springs $e^4$ always maintaining the sleeve $e^2$ in close contact with the collar $c^3$.

In the operation of projectors it frequently happens that the film already passed across the aperture is not taken up by the rewind reel, and said film is therefore looped within the casing, as indicated by dotted lines in Fig. 1, heretofore reaching the space between the aperture and the lens and thus being in the path of the light and preventing projection of the pictures passing the aperture and also being liable to ignition, but by means of my invention this is positively prevented, the film thus not taken up being prevented from reaching the path of the light because of the barrel $e$ and sleeve $e^2$, and the projection is improved because the rays of light passing through the projector are confined, as will be seen.

While I have shown my invention in conjunction with an inclosing casing, it is not essential that it be employed therewith, as it will operate with equal efficiency on any of the projectors using merely a supporting frame for the parts, my intent being to prevent the film from being abnormally moved into the path of light and, while I have shown a present preferred method of producing this result, it will be obvious that many changes may be made therein in order to accommodate the invention to various types of projectors, and to meet varying conditions and, with a reservation to myself of all such changes in and modifications of the details shown and described, what I claim as new and desire to secure by Letters Patent, is:—

1. In a projector provided with a light aperture and a strip of film passed thereover; a movable film-trap door, a movable lens mount, an element on said door and carried thereby, and a coacting element on said mount and carried thereby, said elements serving to prevent the film from entering between said door and mount.

2. In a projector provided with a light aperture and a strip of film passed thereover; a movable film-trap door, a movable lens mount, a tube carried by said door, and a coacting tube carried by said mount, said tubes jointly preventing the film from passing between said door and mount.

3. In a projector provided with a light aperture and a strip of film passed thereover; a film-trap door, a lens, and a spring-actuated, telescopic, casing extending from said door to said lens and permitting the movement of each.

In testimony that I claim the foregoing as my invention I have signed my name in presence of the subscribing witnesses this 18th day of July 1912.

FRANCIS B. CANNOCK.

Witnesses:
  ROBT. B. ABBOTT,
  J. C. LARSEN.